United States Patent
Morita (10) Patent No.: US 11,310,416 B2
(45) Date of Patent: Apr. 19, 2022

(54) CONTROL DEVICE, CONTROL SYSTEM, CONTROL METHOD, AND STORAGE MEDIUM

(71) Applicant: CANON KABUSHIKI KAISHA, Tokyo (JP)

(72) Inventor: Hiroyasu Morita, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/748,485

(22) Filed: Jan. 21, 2020

(65) Prior Publication Data

US 2020/0162667 A1 May 21, 2020

Related U.S. Application Data

(63) Continuation of application No. PCT/JP2018/025341, filed on Jul. 4, 2018.

(30) Foreign Application Priority Data

Aug. 23, 2017 (JP) .............................. JP2017-160529

(51) Int. Cl.
| | |
|---|---|
| *H04N 5/225* | (2006.01) |
| *H04N 5/232* | (2006.01) |
| *G02B 7/04* | (2021.01) |
| *G03B 15/00* | (2021.01) |

(52) U.S. Cl.
CPC ........... *H04N 5/23227* (2018.08); *G02B 7/04* (2013.01); *G03B 15/006* (2013.01); *H04N 5/23296* (2013.01); *H04N 5/23299* (2018.08)

(58) Field of Classification Search
CPC ......................... G08B 13/1965; H04N 5/23296
See application file for complete search history.

(56) References Cited

U.S. PATENT DOCUMENTS

| | | |
|---|---|---|
| 5,305,038 A | 4/1994 | Mogamiya |
| 8,903,568 B1 | 12/2014 | Wang |
| 9,164,506 B1 | 10/2015 | Zang |
| 9,567,078 B2 | 2/2017 | Zang |
| 9,846,429 B2 | 12/2017 | Zang |

(Continued)

FOREIGN PATENT DOCUMENTS

| | | |
|---|---|---|
| CN | 102809969 A | 12/2012 |
| CN | 103426282 A | 12/2013 |

(Continued)

OTHER PUBLICATIONS

Korean Office Action dated Feb. 24, 2021 issued in related Korean Application No. 10-2020-7006659.

(Continued)

*Primary Examiner* — Jason A Flohre
*Assistant Examiner* — Dwight Alex C Tejano
(74) *Attorney, Agent, or Firm* — Venable LLP (57) ABSTRACT

There is provided a control device that controls a moving apparatus to which an image capturing apparatus including a zoom lens is mounted, the device comprising: an obtaining unit configured to obtain lens information including information pertaining to a zoom position of the zoom lens; and a control unit configured to control movement of the moving apparatus based on the lens information.

11 Claims, 8 Drawing Sheets

(56) References Cited

U.S. PATENT DOCUMENTS

| | | | | |
|---|---|---|---|---|
| 2004/0189831 | A1* | 9/2004 | Shibatani | H04N 5/232945 |
| | | | | 348/240.99 |
| 2012/0013708 | A1* | 1/2012 | Okubo | H04N 13/122 |
| | | | | 348/43 |
| 2014/0118840 | A1 | 5/2014 | Enomoto | |
| 2016/0031559 | A1 | 2/2016 | Zang | |
| 2016/0344981 | A1* | 11/2016 | Lunt | G06K 9/0063 |
| 2017/0023938 | A1 | 1/2017 | Zang | |
| 2017/0068246 | A1 | 3/2017 | Zang | |
| 2017/0108877 | A1 | 4/2017 | Zang | |
| 2017/0134631 | A1* | 5/2017 | Zhao | G05D 1/0094 |
| 2017/0142309 | A1* | 5/2017 | Hayashi | H04N 17/002 |
| 2017/0195549 | A1* | 7/2017 | Cao | H04N 5/23212 |
| 2017/0236291 | A1 | 8/2017 | Balley | |
| 2017/0374277 | A1* | 12/2017 | Dobashi | H04N 5/23299 |
| 2018/0054572 | A1* | 2/2018 | Minato | H04N 5/23296 |
| 2019/0158754 | A1* | 5/2019 | Minato | G06T 7/80 |
| 2019/0163035 | A1* | 5/2019 | Mita | B64D 47/08 |
| 2019/0222746 | A1* | 7/2019 | Yu | H04N 5/232127 |
| 2020/0027357 | A1 | 1/2020 | Zhou | |

FOREIGN PATENT DOCUMENTS

| | | |
|---|---|---|
| CN | 105518555 A | 4/2016 |
| CN | 107087427 A | 8/2017 |
| JP | 2016-111414 | 6/2016 |
| JP | 2016-220004 | 12/2016 |
| JP | 2016-225874 | 12/2016 |
| JP | 2017-503226 | 1/2017 |
| JP | 2017-509034 A | 3/2017 |
| JP | 6103672 | 3/2017 |
| JP | 2017-112440 | 6/2017 |
| JP | 6146520 | 6/2017 |
| JP | 2018-010082 | 1/2018 |
| JP | 2018-014608 | 1/2018 |

OTHER PUBLICATIONS

Chinese Office Action dated Jan. 15, 2021 issued in related Chinese Application No. 201880054103.2. (No translation available).
Chinese Office Action dated Jan. 15, 2021 issued in related Chinese Application No. 201880054103.2. (Whole English Translation Included).
European Office Action dated Jul. 21, 2021 issued in related European Application No. 18848454.7.
Japanese Office Action dated Sep. 13, 2021 issued in related Japanese Application No. 2017-160529.
Chinese Notification to Grant Patent dated Sep. 22, 2021 in related Chinese Application No. 201880054103.2 (Partial translation included).

* cited by examiner

CONTROL DEVICE, CONTROL SYSTEM, CONTROL METHOD, AND STORAGE MEDIUM

CROSS-REFERENCE TO RELATED APPLICATIONS

This application is a Continuation of International Patent Application No. PCT/JP2018/025341, filed Jul. 4, 2018, which claims the benefit of Japanese Patent Application No. 2017-160529, filed Aug. 23, 2017, both of which are hereby incorporated by reference herein in their entirety.

BACKGROUND OF THE INVENTION

Field of the Invention

The present invention relates to a control device, a control system, a control method, and a storage medium.

Background Art

Conventionally, there are interchangeable lens-type single lens reflex cameras. One feature of an interchangeable lens-type single lens reflex camera is that a user can easily change lenses and take shots. The user can therefore select an appropriate lens based on the subject and scene he or she wishes to shoot, and shoot an appealing still image or moving image. Meanwhile, as network speeds increase and wireless communication becomes widespread, use cases are being conceived in which cameras are controlled remotely. There are even cameras which have functions for controlling the obtainment, shooting, and so on of images by linking with a device such as a smartphone.

On the other hand, apparatuses called drones, which can be operated remotely using a remote controller and which have flying functionality, are garnering attention. A camera can be mounted to a drone, and still images and moving images can be shot from a variety of angles of view by flying the drone with the camera attached and linking the drone with the camera. Using such a system makes it possible to shoot appealing still images and moving images which thus far could not be shot.

PTL 1 and PTL 2 disclose techniques pertaining to combinations of drones and cameras. PTL 1 discloses a technique in which an image captured by a camera mounted to a drone is displayed in an operating terminal, and the zoom magnification of the camera changes when the display magnification is changed in the operating terminal. PTL 2 discloses a technique in which hovering control is executed for the drone on the basis of image data generated by a camera mounted to the drone.

When an image capturing apparatus such as a camera is mounted to a moving apparatus such as a drone, it is possible that the apparatuses will influence each other. However, conventionally, there have been no techniques for controlling a moving apparatus or an image capturing apparatus having taken such influence into account as appropriate.

CITATION LIST

Patent Literature

PTL 1: Japanese Patent Laid-Open No. 2016-225874
PTL 2: Japanese Patent Laid-Open No. 2016-220004

SUMMARY OF THE INVENTION

Having been conceived in light of such circumstances, the present invention provides a technique which, in a situation where an image capturing apparatus is mounted to a moving apparatus, makes it possible to more appropriately control the moving apparatus or the image capturing apparatus.

To solve the above-described problem, the present invention provides a control device that controls a moving apparatus to which an image capturing apparatus including a zoom lens is mounted, the device characterized by comprising: an obtaining unit configured to obtain lens information including information pertaining to a zoom position of the zoom lens; and a control unit configured to control movement of the moving apparatus based on the lens information.

Further features of the present invention will become apparent from the following description of exemplary embodiments with reference to the attached drawings.

BRIEF DESCRIPTION OF THE DRAWINGS

The appended drawings, which are included in and constitute part of the specification, illustrate embodiments of the present invention, and along with those descriptions serve to illustrate the principles of the present invention.

DESCRIPTION OF THE EMBODIMENTS

Hereinafter, embodiments of the present invention will be described with reference to the attached drawings. It should be noted that the technical scope of the present invention is defined by the claims, and is not limited by the following respective embodiments. Also, not all of the combinations of the aspects that are described in the embodiments are necessarily essential to the present invention. Also, the aspects that are described in the respective embodiments can be combined as appropriate. Note that the same reference numerals denote the same or like components throughout the accompanying drawings.

First Embodiment

Figure 1A:
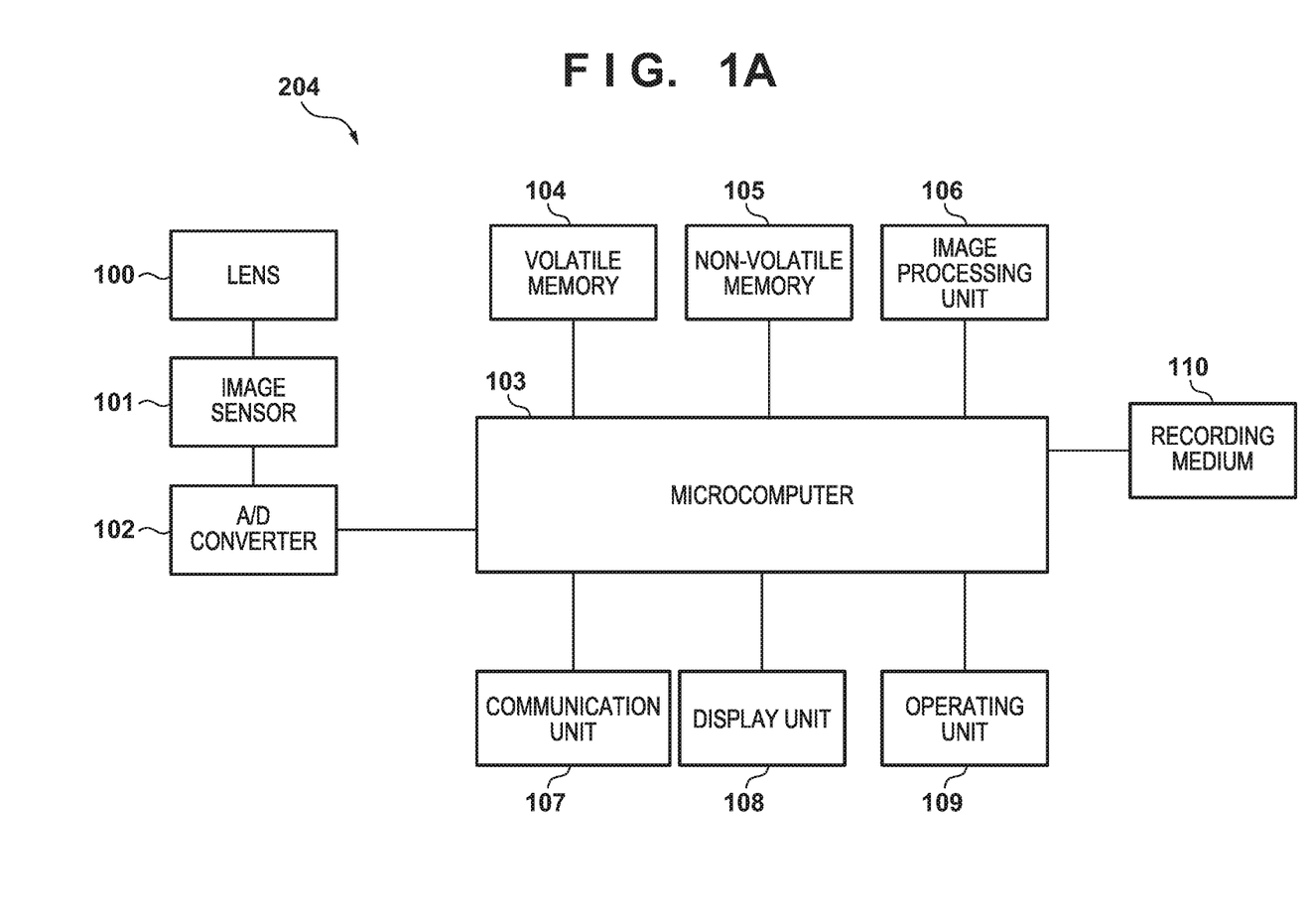
FIG. 1A is a block diagram illustrating the configuration of an image capturing apparatus 204.

FIG. 1A is a block diagram illustrating the configuration of an image capturing apparatus 204. In FIG. 1A, 100 is a lens (a shooting lens). A fixed focal lens, a zoom lens, and the like exist as types of the lens 100. A microcomputer 103, described later, can obtain information such as a focal length, the current zoom position, the length of the lens barrel, and so on from the lens 100. The lens 100 can move the zoom position when zoom driving has been instructed by the microcomputer 103 or the like. Note that the image capturing apparatus 204 may be what is known as an interchangeable lens-type camera, or may be an integrated lens-type camera. If the image capturing apparatus 204 is the interchangeable lens-type, the apparatus includes a lens mount for attaching/detaching the lens 100, and can communicate with the attached lens 100 via the lens mount and obtain various types of lens information such as the specs, the current zoom position, and the like.

101 is an image sensor. A CCD, a CMOS sensor, or the like is used as the image sensor 101. The image sensor 101 converts a subject image which has been formed by the lens 100 into an electrical signal. 102 is an A/D converter. The A/D converter 102 converts analog output signals from the image sensor 101 into digital signals.

103 is a microcomputer. The microcomputer 103 executes control of the image capturing apparatus 204 as a whole, including control of the various constituent elements, data processing, and the like. The microcomputer 103 carries out control in response to operation instructions from an operating unit 109, generates and plays back images to be displayed in a display unit 108, carries out network control via a communication unit 107, and so on. The microcomputer 103 furthermore implements all processing carried out by the image capturing apparatus 204, including communication processing when linking with a drone 205, control for receiving the state of the drone 205, processing for controlling the drone 205, and so on, which will be described later. The microcomputer 103 also processes control of communication with the lens 100. The microcomputer 103 also implements control pertaining to the lens 100, including whether or not the lens 100 is attached, obtaining the zoom position, obtaining a shortest shooting distance, controlling the zooming of the lens 100, and so on.

104 is volatile memory. The volatile memory 104 temporarily holds image data converted into a digital signal by the A/D converter 102. 105 is non-volatile memory. The non-volatile memory 105 holds control programs for the image capturing apparatus 204, executed by the microcomputer 103. The non-volatile memory 105 also stores setting values of the image capturing apparatus 204.

106 is an image processing unit. The image processing unit 106 carries out image processing on images that have been shot. Also, in cooperation with the microcomputer 103, the image processing unit 106 generates a live view image for confirming the composition, focus, and the like during shooting.

107 is a communication unit. The communication unit 107 is implemented using technology such as wireless LAN, for example. With respect to the communication technology, there is no particular need to take into account the distinction between a wired connection, a wireless connection, and so on. The present embodiment assumes that the image capturing apparatus 204 communicates and links with the drone 205 via the communication unit 107. The linking method may be a method that uses a dedicated Software Development Kit (SDK, hereinafter), or a public API method such as the HTTP-based WebAPI. Although the present embodiment assumes that an SDK or a WebAPI is used, a control mechanism publicized by the image capturing apparatus 204 or the drone 205 may be used. Alternatively, the control may be carried out using a linking mechanism publicized by both the image capturing apparatus 204 and the drone 205. In the present embodiment, the linking method is not particularly limited.

108 is a display unit. The display unit 108 is controlled by the microcomputer 103, and displays menus, displays playback images, and the like. The display unit 108 also displays the live view image. 109 is an operating unit. The operating unit 109 can make operations in a user interface displayed in the display unit 108. Key operations, touch panel operations, and the like are assumed as operation methods for the operating unit 109.

110 is recording medium. The recording medium 110 is compact flash (registered trademark) (CF), for example. The microcomputer 103 can write data from the volatile memory 104 into the recording medium 110, read out data saved in the recording medium 110 to the volatile memory 104, and the like.

Figure 1B:
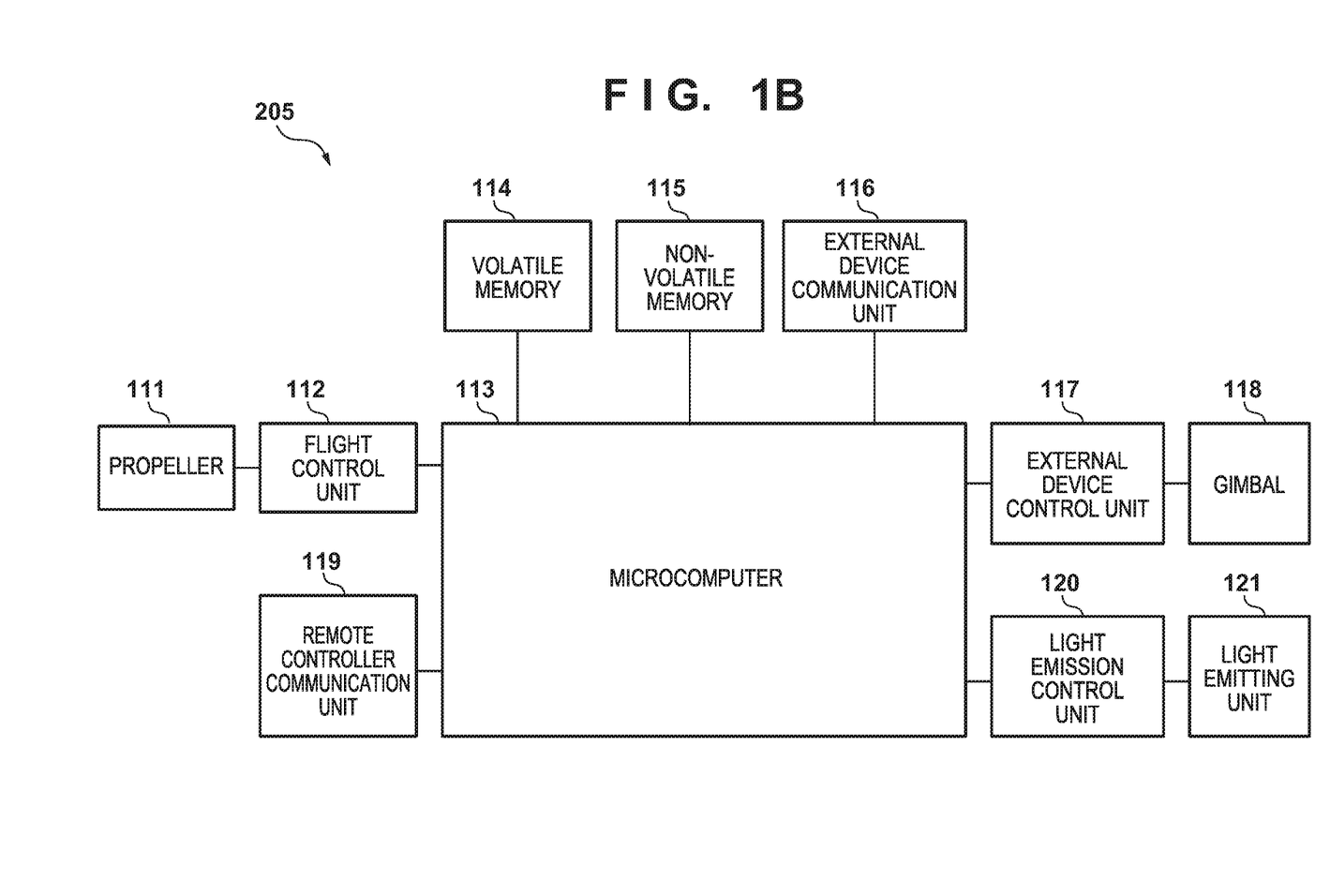
FIG. 1B is a block diagram illustrating the configuration of a drone 205 (an unmanned aircraft).

FIG. 1B is a block diagram illustrating the configuration of the drone 205 (an unmanned aircraft), which is an example of a moving apparatus. In FIG. 1B, 111 is a propeller. 112 is a flight control unit. The flight control unit 112 controls the flight of the drone 205 in tandem with a microcomputer 113. The flight control unit 112 carries out processing for controlling the drone 205 not to fly, control for obtaining the length and height of the propeller, and so on. The flight control unit 112 also carries out control so that the drone 205 itself (or an overall flight system including the mounted image capturing apparatus 204) does not collide (make contact) with an object such as a subject or the like. Note that any known technique can be used as a collision avoidance algorithm for the drone 205.

113 is a microcomputer. The drone 205 is controlled by the microcomputer 113. The microcomputer 113 carries out a variety of processes by working in tandem with other constituent elements. 114 is volatile memory. 115 is non-volatile memory. The non-volatile memory 115 holds control programs executed by the microcomputer 113.

116 is an external device communication unit. The external device communication unit 116 communicates with the communication unit 107 of the image capturing apparatus 204 in order to implement the link between the drone 205 and the image capturing apparatus 204. The communication method is not particularly limited, and may be wired or wireless. The communication protocol is also not limited. Commands for controlling the drone 205, notifications pertaining to the state of the drone 205, commands for controlling the image capturing apparatus 204, information pertaining to the lens 100 attached to the image capturing apparatus 204, and the like are conceivable as the content of the communication.

117 is an external device control unit. 118 is a gimbal. The image capturing apparatus 204 can be mounted to the drone 205 using the gimbal 118. The external device control unit 117 can, in tandem with the microcomputer 113, control the angle and the like of the image capturing apparatus 204 mounted to the gimbal 118.

119 is a remote controller communication unit. The drone 205 is controlled by a user who holds a remote controller. However, the drone 205 may be a self-flying drone capable of flying in a state where a flight path and the like have been set in advance. If the drone 205 is controlled by remote controller operations made by the user, the microcomputer 113 receives control commands from the remote controller via the remote controller communication unit 119.

120 is a light emission control unit. 121 is a light emitting unit. The light emitting unit 121 is built into the drone 205 in anticipation of nighttime flight or the like, so that the user can see where the drone 205 is flying. The light emission control unit 120 controls the emission of light by the light emitting unit 121. The light emitting unit 121 includes an LED or the like, for example, but the type of the light emitting unit is not particularly limited.

Figure 2:
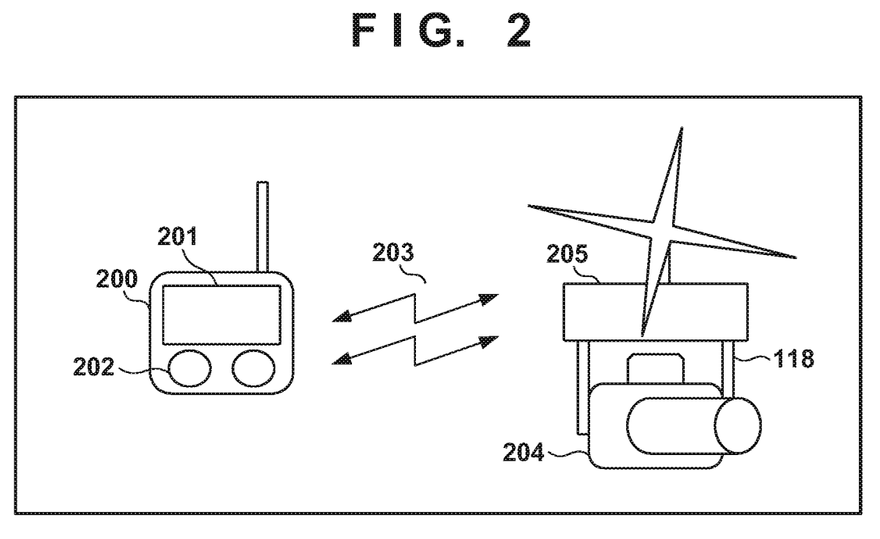
FIG. 2 is a schematic diagram illustrating a remote control system for the drone 205.

FIG. 2 is a schematic diagram illustrating a remote control system for the drone 205. As illustrated in FIG. 2, the image capturing apparatus 204 is mounted to the drone 205, supported by the gimbal 118 of the drone 205.

200 is a remote controller for remotely controlling the drone 205. The user can control the drone 205 by operating the remote controller 200. The remote controller 200 is not limited to a remote controller prepared specifically for the drone 205. For example, at least one piece of software for controlling the drone 205 may be installed in a mobile device such as a smartphone, a tablet device, and used as the remote controller 200. 201 is a display unit. Image data captured by the image capturing apparatus 204 mounted to the drone 205 can be displayed in the display unit 201 of the remote controller 200. The user can confirm the angle of view and the like of a still image or a moving image to be shot while viewing the display unit 201. Additionally, if some kind of error or the like has occurred while the image capturing apparatus 204 and the drone 205 are linked with each other to provide a function, the drone 205 notifies the remote controller 200 of the error, and the display unit 201 displays that notification.

202 is an operating unit. By operating the operating unit 202 of the remote controller 200, the user can control the drone 205 to take off, land, travel forward, rotate, and so on. In addition to controlling the drone 205, the user can also control the image capturing apparatus 204 via the drone 205. As described above, the drone 205 and the image capturing apparatus 204 can communicate with each other. As such, the user can control the lens 100 attached to the image capturing apparatus 204 by operating the operating unit 202, for example. In this manner, the user can carry out various types of control pertaining to the drone 205 and the image capturing apparatus 204 by using the remote controller 200, and the types of control that can be carried out are not particularly limited.

203 represents communication between the remote controller 200 and the remote controller communication unit 119 of the drone 205. For example, proportional control is assumed to be used for the remote controller radio waves for controlling the drone 205. It is assumed that the drone 205 will fly at an altitude of several hundreds of meters, and it is therefore basically assumed that long-distance wireless or wired communication will be used. The method of the communication between the remote controller 200 and the drone 205 is not particularly limited.

In the present embodiment, a predetermined control device controls the image capturing apparatus 204 or the drone 205 as appropriate by taking into account the influence which the image capturing apparatus 204 and the drone 205 have on each other. To be more specific, the control device controls the image capturing apparatus 204 or the drone 205 based on at least one of information pertaining to the lens 100 of the image capturing apparatus 204 (lens information) and information pertaining to the drone 205 (moving apparatus information). Although the details of the lens information and the moving apparatus information, and the details of the control executed by the control device, are not particularly limited, five examples of control will be described below with reference to FIG. 3A to FIG. 3E.

Note that the implementation of the control device mentioned here is not particularly limited, and any desired implementation may be employed. For example, the control device may be implemented by the microcomputer 103, or may be implemented by the microcomputer 113. In other words, the control device may be included in the image capturing apparatus 204, or may be included in the drone 205. Alternatively, the control device may be a device which is separate from the image capturing apparatus 204 and the drone 205 and which is capable of communicating with the image capturing apparatus 204 and the drone 205. Or, the control device may be implemented by a combination of a plurality of microcomputers (e.g., the microcomputer 103 and the microcomputer 113).

If the control device is implemented by the microcomputer 103, the processing of each step in FIG. 3A to FIG. 3E is realized by the microcomputer 103 executing a control program stored in the non-volatile memory 105, unless otherwise specified. If the control device is implemented by the microcomputer 113, the processing of each step in FIG. 3A to FIG. 3E is realized by the microcomputer 113 executing a control program stored in the non-volatile memory 115, unless otherwise specified. If the control device is a device which is separate from the image capturing apparatus 204 and the drone 205, the control device includes a microcomputer and non-volatile memory, which are not shown. In this case, the processing of each step in FIG. 3A to FIG. 3E is realized by the microcomputer, which is not shown, executing a control program stored in the non-volatile memory, which is not shown, unless otherwise specified. If the control device is implemented by a combination of a plurality of microcomputers, the processing of each step in FIG. 3A to FIG. 3E is realized by the plurality of microcomputers handling different roles as appropriate, unless otherwise specified.

The image capturing apparatus 204 and the drone 205 carry out communication pertaining to information and control commands as appropriate in accordance with the implementation of the control device. For example, when the control device requires information pertaining to the image capturing apparatus 204, no communication is necessary if the control device is included in the image capturing apparatus 204; however, if the control device is included in the drone 205, the image capturing apparatus 204 sends requested information to the drone 205. Furthermore, if the control device is at least partially implemented by a device which is separate from the image capturing apparatus 204 and the drone 205, the necessary information is communicated as appropriate between the image capturing apparatus 204/the drone 205 and the control device via a communication unit included in the separate device. If the control device is not included in the drone 205, the control of the drone 205 is carried out by communicating control commands between the control device and the drone 205. Likewise, if the control device is not included in the image capturing apparatus 204, the control of the image capturing apparatus 204 is carried out by communicating control commands between the control device and the image capturing apparatus 204.

Note that the communication between the apparatuses may be carried out via another apparatus. For example, when the control device sends control commands for controlling the image capturing apparatus 204, the control device may send the control commands to the image capturing apparatus 204 via the drone 205.

First Example of Control

If the drone 205 comes too close to a subject, it is possible that the distance between the image capturing apparatus 204 and the subject will drop below a shortest shooting distance (the shortest distance at which the subject can be brought into focus). In this case, the image capturing apparatus 204 may be unable to focus on the subject, and may therefore be unable to shoot the subject appropriately. The first example of control will describe control for suppressing the occurrence of such a situation.

Figure 3A:
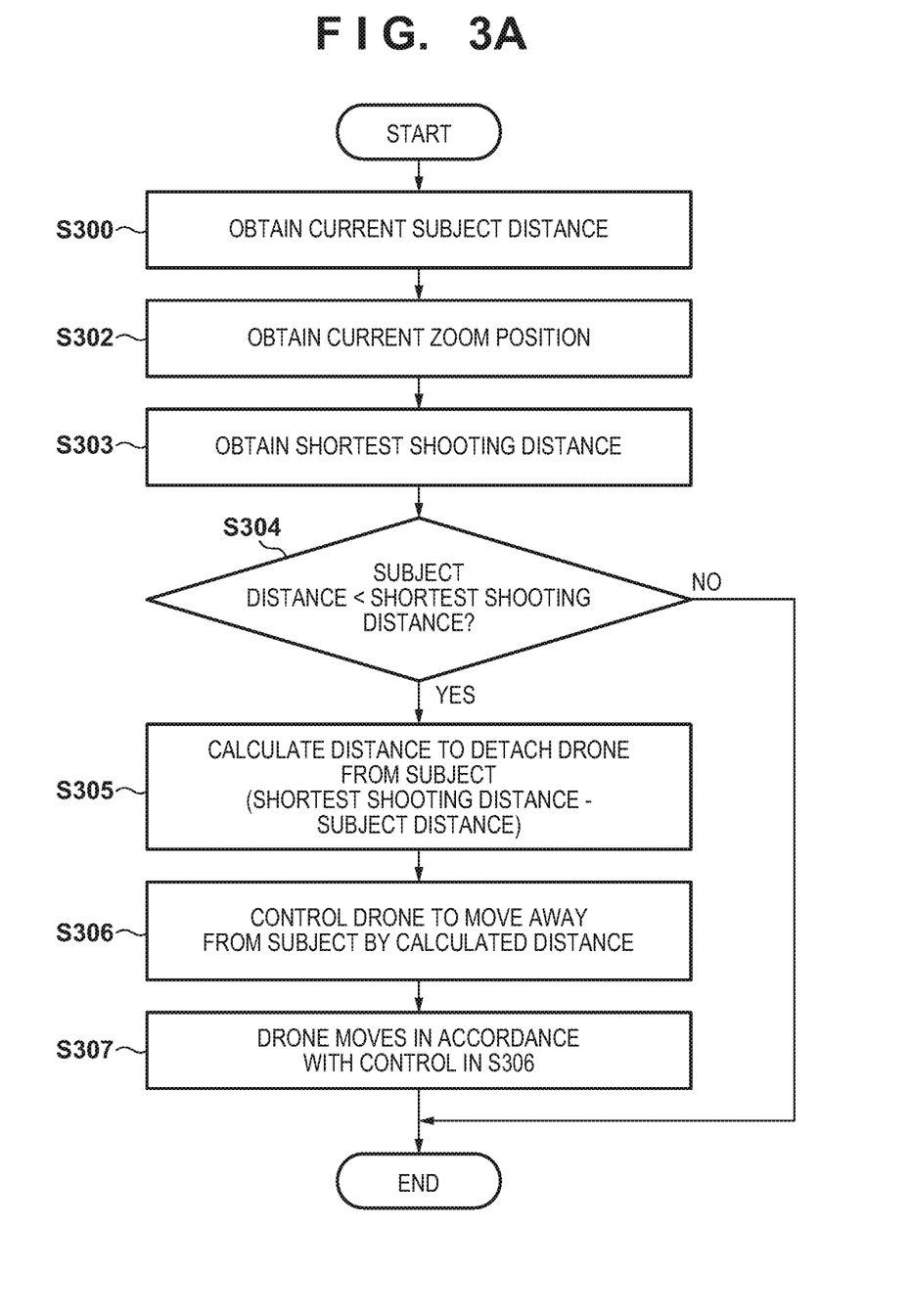
FIG. 3A is a flowchart illustrating a first example of control executed by a control device in a control system including the control device, the image capturing apparatus 204, and the drone 205.

FIG. 3A is a flowchart illustrating the first example of control executed by the control device in the control system including the control device, the image capturing apparatus 204, and the drone 205. The processing of this flowchart starts when a shooting request is issued to the image capturing apparatus 204. Note that if a so-called live view image is sent to the remote controller 200 from the drone 205, this flowchart may start in response to a request to send the live view image.

In S300, the control device obtains information indicating the current distance between the image capturing apparatus 204 and a predetermined subject (the current subject distance). The subject distance can be obtained by using a function of the image capturing apparatus 204. For example, in response to an instruction from the control device, the microcomputer 103 obtains the subject distance from a rangefinding unit (not shown) and provides the subject distance to the control device. In S302, the control device obtains the current zoom position of the lens 100. Here, the current zoom position is obtained from the lens 100 by the lens 100 linking with the microcomputer 103. In S303, the control device obtains the shortest shooting distance based on the current zoom position. In S304, the control device determines whether or not the current subject distance obtained in S300 is less than the shortest shooting distance obtained in S303 (less than the shortest subject distance). If (subject distance)<(shortest shooting distance), the processing moves to S305, and if not, the processing of this flowchart ends. (Subject distance)<(shortest shooting distance) means that the drone 205 has come too close to the subject and the subject is therefore not in focus. To avoid such a situation, in S305, the control device calculates a distance to move the drone 205. Specifically, the control device subtracts the subject distance obtained in S300 from the shortest shooting distance obtained in S303. In S306, the control device controls the drone 205 to move in a direction away from the subject by the distance calculated in S305. In other words, the control device controls the drone 205 to move so that the subject distance becomes greater than or equal to the shortest shooting distance (greater than or equal to the shortest subject distance). In S307, the drone 205 moves away from the subject in accordance with the control by the control device carried out in S306.

As described above, if (subject distance)<(shortest shooting distance), the control device controls the drone 205 so that (subject distance)≥(shortest shooting distance). As a result, the occurrence of a situation in which the subject cannot be brought into focus can be suppressed.

The flowchart illustrated in FIG. 3A is executed repeatedly when the drone 205 is sending a live view image or is shooting a moving image.

Additionally, in the present embodiment, the control device may make a notification to the remote controller 200 if (subject distance)<(shortest shooting distance). Having received the notification, the remote controller 200 may display guidance in the display unit 201, reading, for example, "the drone is closer to the subject than the shortest shooting distance. The drone will be moved away." Alternatively, the control device may only notify the remote controller 200 without controlling the flight of the drone 205, and the remote controller 200 may display guidance in the display unit 201, reading "the drone is closer to the subject than the shortest shooting distance. Please move the drone away."

Second Example of Control

If the lens 100 has a short focal length (e.g., when the zoom position of a wide-angle lens is on the wide side), a predetermined part of the drone 205 (e.g., the propeller 111) may appear in the image that is shot. The second example of control will describe control for suppressing the occurrence of such a situation.

Figure 3B:
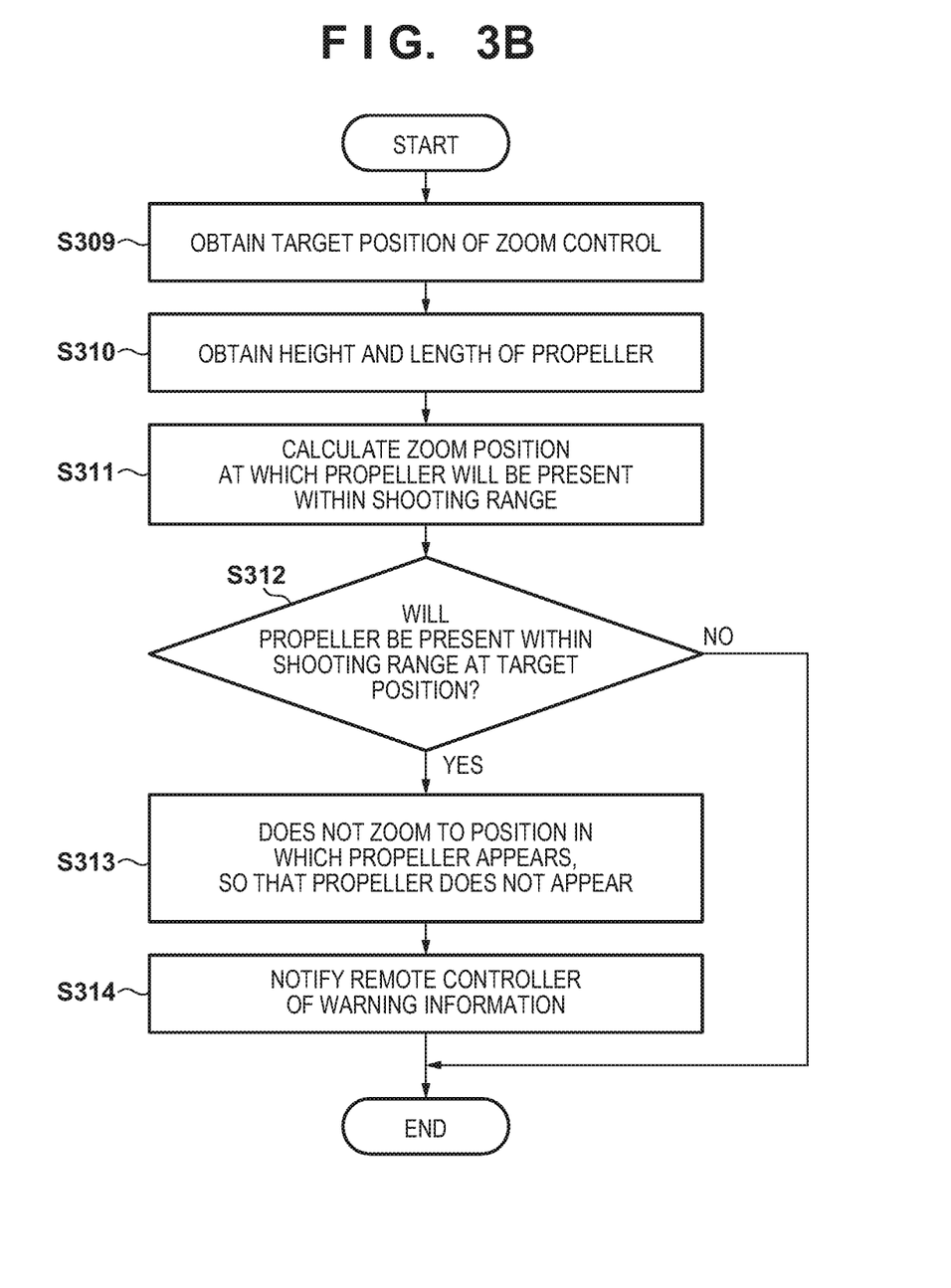
FIG. 3B is a flowchart illustrating a second example of control executed by the control device in the control system including the control device, the image capturing apparatus 204, and the drone 205.

FIG. 3B is a flowchart illustrating the second example of control executed by the control device in the control system including the control device, the image capturing apparatus 204, and the drone 205. The processing of this flowchart starts when a request to change the zoom position is issued to the image capturing apparatus 204.

In S309, the control device obtains a target position corresponding to the request to change the zoom position (a zoom position to be moved to in zoom control for moving the zoom position). In S310, the control device obtains information indicating the position of the propeller 111 of the drone 205 (a height and a length). The flight control unit 112 and the microcomputer 113 of the drone 205 are used in this obtaining process. In S311, the control device calculates a zoom position at which the propeller 111 will be present within a shooting range, based on the height and the length of the propeller 111 obtained in S310. Here, the control device may calculate the entire range of zoom positions in which the propeller 111 will be present within the shooting range, or may calculate the zoom position, furthest on the tele side, in which the propeller 111 will be present within the shooting range. In S312, the control device determines whether or not the propeller 111 will be present within the shooting range if the zoom position of the lens 100 is moved to the target position, based on the target position obtained in S309 and the zoom position obtained in S311. If the propeller 111 will be present in the shooting range, the processing moves to S313, and if not, the processing of this flowchart ends. In S313, the control device carries out zoom control of the lens 100 so as not to move to a zoom position at which the propeller 111 will be present in the shooting range. For example, the control device stops the movement of the zoom position of the lens 100 at the boundary of the range of zoom positions at which the propeller 111 will be present in the shooting range, so that the zoom position does not enter that range. In S314, the control device notifies the remote controller 200 of warning information indicating that zoom control has been carried out to ensure the zoom position does not move to a zoom position at which the propeller 111 will be present within the shooting range. In response to the notification, the remote controller 200 makes a warning display in the display unit 201.

As described thus far, if a predetermined part of the drone 205 (e.g., the propeller 111) will be present in the shooting range at the target position of the zoom control, the control device carries out zoom control so that the lens 100 does not move to a zoom position at which the predetermined part will be present in the shooting range. This makes it possible to suppress the occurrence of a situation in which a predetermined part of the drone 205 (e.g., the propeller 111) appears in the image that is shot.

Note that like the first example of control, the control device may only notify the remote controller 200, without carrying out zoom control. This also applies to a third example of control, which will be described below.

Third Example of Control

The third example of control is a variation on the second example of control. The third example of control will describe control for suppressing the occurrence of a situation in which a predetermined part of the drone 205 (e.g., the propeller 111) appears in the image that is shot.

Figure 3C:
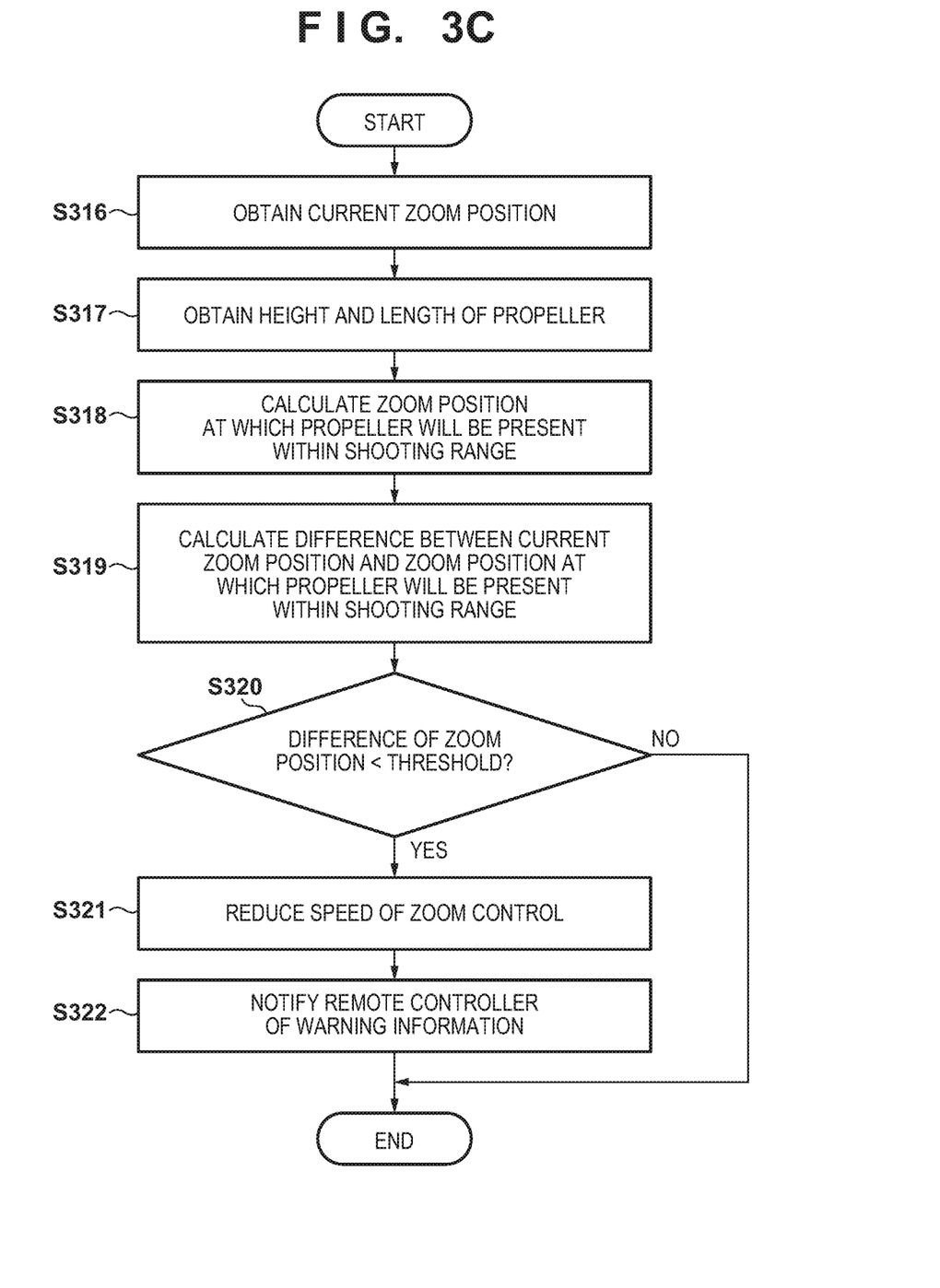
FIG. 3C is a flowchart illustrating a third example of control executed by the control device in the control system including the control device, the image capturing apparatus 204, and the drone 205.

FIG. 3C is a flowchart illustrating the third example of control executed by the control device in the control system including the control device, the image capturing apparatus 204, and the drone 205. The processing of this flowchart starts when a request to change the zoom position in the wide direction (toward a zoom position at which the propeller 111 will be present in the shooting range) is issued to the image capturing apparatus 204.

In S316, the control device obtains the current zoom position of the lens 100 through the same processing such as that of S302 (FIG. 3A). In S317, the control device obtains information indicating the position of the propeller 111 of the drone 205 (a height and a length) through the same processing such as that of S310 (FIG. 3B). In S318, the control device calculates a zoom position at which the propeller 111 will be present within the shooting range through the same processing such as that of S311 (FIG. 3B). In S319, the control device calculates a difference between the current zoom position and the zoom position at which the propeller 111 will be present within the shooting range. In S320, the control device determines whether or not the difference calculated in S319 is less than a threshold. If the difference is less than the threshold (i.e., if the current zoom position is distanced from the zoom position at which the propeller 111 will be present in the shooting range by greater than or equal to the threshold), the processing moves to S321, and if not, the processing of this flowchart ends. In S321, the control device reduces the speed of the zoom control. In other words, the control device carries out control to move the zoom position of the lens 100 at a lower speed than when the current zoom position is distanced from the zoom position at which the propeller 111 will be present in the shooting range by greater than or equal to the threshold. In S322, the control device notifies the remote controller 200 of warning information indicating that the speed of the zoom control has been reduced. In response to the notification, the remote controller 200 makes a warning display in the display unit 201.

As described thus far, if, when zoom control in the wide direction is carried out, the difference between the current zoom position and a zoom position at which a predetermined part of the drone 205 (e.g., the propeller 111) will be present within the shooting range is less than a threshold, the control device reduces the speed of the zoom control. This makes it possible to suppress the occurrence of a situation in which a predetermined part of the drone 205 (e.g., the propeller 111) appears in the image that is shot.

Fourth Example of Control

To effectively avoid a situation where the drone 205 collides (makes contact) with an obstruction using the aforementioned collision avoidance algorithm, the overall size of the flight system, including the size of the image capturing apparatus 204 mounted to the drone 205, is required. However, if the length of the lens barrel of the lens 100 changes in response to zoom control, the size of the flight system will change as well. As a result, it may not be possible to carry out effective collision avoidance. The fourth example of control will describe control for suppressing the occurrence of such a situation.

Figure 3D:
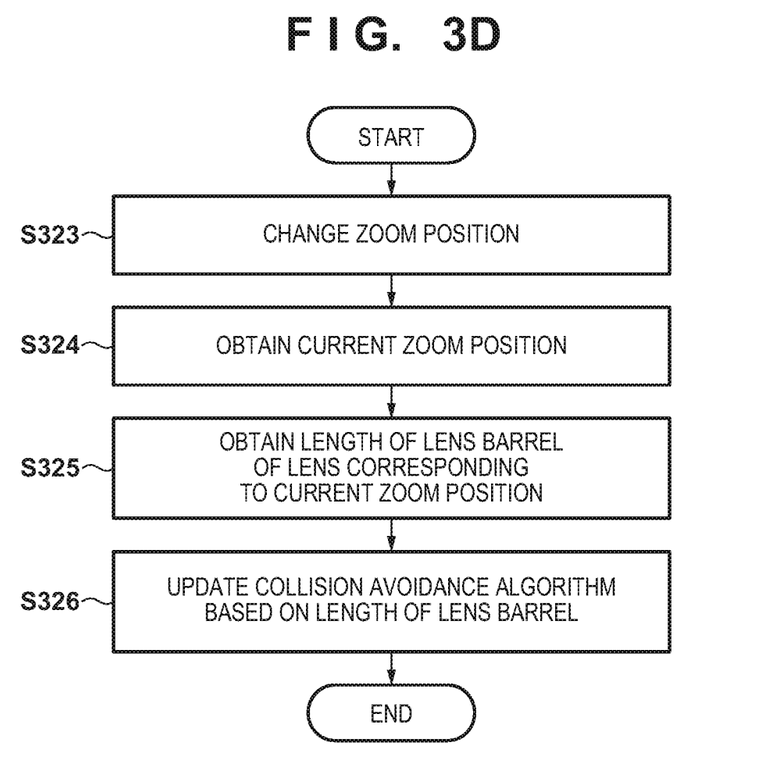
FIG. 3D is a flowchart illustrating a fourth example of control executed by the control device in the control system including the control device, the image capturing apparatus 204, and the drone 205.

FIG. 3D is a flowchart illustrating the fourth example of control executed by the control device in the control system including the control device, the image capturing apparatus 204, and the drone 205. The processing of this flowchart starts when a request to change the zoom position is issued to the image capturing apparatus 204.

In S323, the control device changes the zoom position of the lens 100 in response to the request to change the zoom position. In S324, the control device obtains the current zoom position of the lens 100 through the same processing such as that of S302 (FIG. 3A). In S325, the control device obtains the length of the lens barrel of the lens 100 corresponding to the zoom position obtained in S324. Here, the length of the lens barrel is obtained from the lens 100 by the lens 100 linking with the microcomputer 103, for example. Alternatively, the length of the lens barrel of the lens 100 at each of zoom positions may be stored in the non-volatile memory 105 in advance. In S326, the control device notifies the drone 205 of the length of the lens barrel obtained in S325, and controls the drone 205 to update the collision avoidance algorithm (or change parameters) based on the length of the lens barrel.

As described thus far, the control device updates the collision avoidance algorithm of the drone 205 based on the length of the lens barrel. More specifically, by updating the collision avoidance algorithm based on the length of the lens barrel, the control device controls the movement (flight) of the drone 205 so that at least the lens barrel does not make contact with an object (an obstruction). As a result, the drone 205 can effectively avoid a collision with the obstruction even when the length of the lens barrel of the lens 100 changes.

Note that in addition to a collision avoidance algorithm, the above-described example of control can also be applied in various types of flight control algorithms for controlling actions such as steering, rotation, flight speed, and so on, for example. For example, the lens barrel is very long when the lens 100 is at the tele end, and thus the weight balance and moment of the system constituted by the control device, the image capturing apparatus 204, and the drone 205 are different from when the lens 100 is at the wide end. Accordingly, the control device updates the flight control algorithm (or changes parameters) based on the length, weight, or the like of the lens barrel.

Fifth Example of Control

Consider a situation where the total of the weight of the lens 100 and the weight of the body of the image capturing apparatus 204 (the weight of the image capturing apparatus 204 without the lens 100) exceeds a maximum weight that can be mounted to the drone 205 (a mountable weight). If the drone 205 starts flying in such a situation, it is possible that the drone 205 will be unable to fly correctly. In particular, if the image capturing apparatus 204 is configured so that the lens 100 is interchangeable, the total weight will vary depending on the type of the lens 100 that is attached. There is thus an increased risk of the user flying the drone 205 without noticing that the mounting weight exceeds the mountable weight. The fifth example of control will describe control for suppressing the occurrence of such a situation.

Figure 3E:
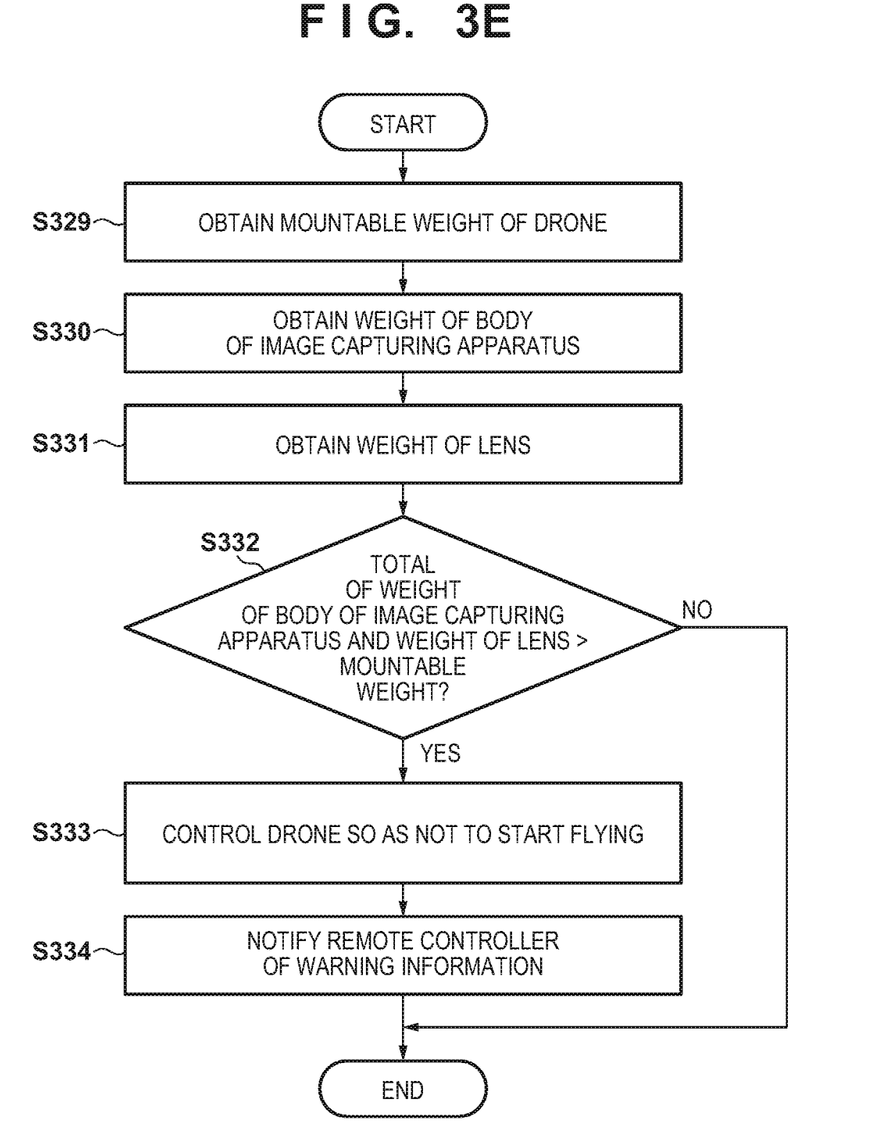
FIG. 3E is a flowchart illustrating a fifth example of control executed by the control device in the control system including the control device, the image capturing apparatus 204, and the drone 205.

FIG. 3E is a flowchart illustrating the fifth example of control executed by the control device in the control system including the control device, the image capturing apparatus 204, and the drone 205. The processing of this flowchart starts when a flight start request is issued to the drone 205.

In S329, the control device obtains the mountable weight of the drone 205. The mountable weight is stored in the non-volatile memory 115 of the drone 205, for example. In S330, the control device obtains the weight of the body of the image capturing apparatus 204. The weight of the body of the image capturing apparatus 204 is stored in the non-volatile memory 105 of the image capturing apparatus 204, for example. In S331, the control device obtains the weight of the lens 100. Here, the weight is obtained from the lens 100 by the lens 100 linking with the microcomputer 103, for example. Alternatively, the weight of each of lens types may be stored in the non-volatile memory 105 in advance. In S332, the control device determines whether or not the total of the weight of the body of the image capturing apparatus 204 and the weight of the lens 100 exceeds the mountable weight. If the total of the weight of the body of the image capturing apparatus 204 and the weight of the lens 100 exceeds the mountable weight, the processing moves to S333, and if not, the processing of this flowchart ends. In S333, the control device controls the drone 205 so as not to start flying. In S334, the control device notifies the remote controller 200 of warning information indicating that the drone 205 has been controlled so as not to start flying. In response to the notification, the remote controller 200 makes a warning display in the display unit 201.

As described thus far, the control device controls the drone 205 so as not to start flying when the total of the weight of the body of the image capturing apparatus 204 and the weight of the lens 100 exceeds the mountable weight. As a result, the likelihood that the drone 205 cannot fly correctly can be reduced.

Note that if the drone 205 is capable of traveling over land, the fifth example of control can be changed so as to control the travel of the drone 205. In this case, in S333, the control device controls the drone 205 so as not to start traveling. To generalize further, the control device can control any desired type of movement, including flying and traveling.

As described thus far with reference to the first to fifth examples of control, according to the first embodiment, the control device controls the drone 205 based on information pertaining to the lens 100, controls the lens 100 based on information pertaining to the lens 100 and information pertaining to the drone 205, and so on. Thus according to the present embodiment, the image capturing apparatus 204 or the drone 205 can be controlled more appropriately in a situation where the image capturing apparatus 204 is mounted to the drone 205.

Although the foregoing describes the drone 205, which is an unmanned aircraft, as an example of the moving apparatus, the moving apparatus of the present embodiment is not limited thereto, and it is not necessary that the moving apparatus fly. The moving apparatus may be a vehicle that travels over land, for example.

Additionally, the first to fifth examples of control describe a shooting request, a request to change the zoom position, and a flight start request for the drone 205 as examples of triggers for carrying out control. However, as per the examples given in the present embodiment as well, various types of control can be realized by communicating information in advance, in addition to the aforementioned triggers. Accordingly, in all of the first to fifth examples of control, the various types of control can also be realized by communicating information of the image capturing apparatus 204 to the drone 205, or communicating information of the drone 205 to the image capturing apparatus 204, in advance.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, in a situation where an image capturing apparatus is mounted to a moving apparatus, the moving apparatus or the image capturing apparatus can be more appropriately controlled.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A control device that controls a moving apparatus to which an image capturing apparatus including a zoom lens is mounted, the control device comprising:
   a memory storing a program; and
   a computer that executes the program stored in the memory, and controls movement of the moving apparatus,
   wherein the computer:
   obtains information indicating a maximum weight that can be mounted to the moving apparatus;
   obtains information indicating a weight of the zoom lens;
   obtains information indicating a weight of the image capturing apparatus without the zoom lens;
   determines whether or not a total of the weight of the zoom lens and the weight of the image capturing apparatus without the zoom lens exceeds the maximum weight; and
   in a case where the total exceeds the maximum weight, controls the movement of the moving apparatus so that the moving apparatus does not start moving.

2. The control device according to claim 1, wherein the moving apparatus is a flying object.

3. The control device according to claim 1, wherein the control device is included in the image capturing apparatus or the moving apparatus.

4. A control device that controls an image capturing apparatus including a zoom lens, the image capturing apparatus being mounted to a moving apparatus, the control device comprising:
- a memory storing a program; and
- a computer that executes the program stored in the memory, and controls the zoom lens,
- wherein the computer:
- obtains information indicating a position of a predetermined part of the moving apparatus;
- obtains information indicating a current zoom position of the zoom lens;
- determines, based on the position of the predetermined part, whether or not the current zoom position is distanced from a zoom position at which the predetermined part will be present within a shooting range by greater than or equal to a threshold; and
- in a case where the current zoom position is not distanced from the zoom position at which the predetermined part will be present within the shooting range by greater than or equal to the threshold, controls the zoom lens so that the zoom position of the zoom lens is moved at a slower speed than when the current zoom position is distanced from the zoom position at which the predetermined part will be present within the shooting range by greater than or equal to the threshold.

5. The control device according to claim 4, wherein the moving apparatus is a flying object including a propeller, and
the predetermined part is the propeller.

6. The control device according to claim 4, wherein the moving apparatus is a flying object.

7. The control device according to claim 4, wherein the control device is included in the image capturing apparatus or the moving apparatus.

8. A method of controlling a moving apparatus to which an image capturing apparatus including a zoom lens is mounted, the method comprising:
- obtaining information indicating a maximum weight that can be mounted to the moving apparatus;
- obtaining information indicating a weight of the zoom lens;
- obtaining information indicating a weight of the image capturing apparatus without the zoom lens;
- determining whether or not a total of the weight of the zoom lens and the weight of the image capturing apparatus without the zoom lens exceeds the maximum weight; and
- in a case where the total exceeds the maximum weight, controlling the movement of the moving apparatus so that the moving apparatus does not start moving.

9. A method of controlling an image capturing apparatus including a zoom lens, the image capturing apparatus being mounted to a moving apparatus, the method comprising:
- obtaining information indicating a position of a predetermined part of the moving apparatus;
- obtaining information indicating a current zoom position of the zoom lens;
- determining, based on the position of the predetermined part, whether or not the current zoom position is distanced from a zoom position at which the predetermined part will be present within a shooting range by greater than or equal to a threshold; and
- in a case where the current zoom position is not distanced from the zoom position at which the predetermined part will be present within the shooting range by greater than or equal to the threshold, controls the zoom lens so that the zoom position of the zoom lens is moved at a slower speed than when the current zoom position is distanced from the zoom position at which the predetermined part will be present within the shooting range by greater than or equal to the threshold.

10. A non-transitory storage medium that stores a program causing a computer to execute a method of controlling a moving apparatus to which an image capturing apparatus including a zoom lens is mounted, the method comprising:
- obtaining information indicating a maximum weight that can be mounted to the moving apparatus;
- obtaining information indicating a weight of the zoom lens;
- obtaining information indicating a weight of the image capturing apparatus without the zoom lens;
- determining whether or not a total of the weight of the zoom lens and the weight of the image capturing apparatus without the zoom lens exceeds the maximum weight; and
- in a case where the total exceeds the maximum weight, controlling the movement of the moving apparatus so that the moving apparatus does not start moving.

11. A non-transitory storage medium that stores a program causing a computer to execute a method of controlling an image capturing apparatus including a zoom lens, the image capturing apparatus being mounted to a moving apparatus, the method comprising:
- obtaining information indicating a position of a predetermined part of the moving apparatus;
- obtaining information indicating a current zoom position of the zoom lens;
- determining, based on the position of the predetermined part, whether or not the current zoom position is distanced from a zoom position at which the predetermined part will be present within a shooting range by greater than or equal to a threshold; and
- in a case where the current zoom position is not distanced from the zoom position at which the predetermined part will be present within the shooting range by greater than or equal to the threshold, controls the zoom lens so that the zoom position of the zoom lens is moved at a slower speed than when the current zoom position is distanced from the zoom position at which the predetermined part will be present within the shooting range by greater than or equal to the threshold.

* * * * *